United States Patent
Walter et al.

(10) Patent No.: US 6,896,622 B1
(45) Date of Patent: May 24, 2005

(54) ELASTIC SHAFT COUPLING

(75) Inventors: Jürgen Walter, Haltern (DE); Ulrich Falz, Dortmund (DE)

(73) Assignee: Hackforth GmbH, Herne (DE)

( * ) Notice: Subject to any disclaimer, the term of this patent is extended or adjusted under 35 U.S.C. 154(b) by 0 days.

(21) Appl. No.: 10/130,202
(22) PCT Filed: Nov. 10, 2000
(86) PCT No.: PCT/EP00/11156
  § 371 (c)(1),
  (2), (4) Date: May 14, 2002
(87) PCT Pub. No.: WO01/36833
  PCT Pub. Date: May 25, 2001

(30) Foreign Application Priority Data

Nov. 15, 1999 (DE) .......................................... 199 55 051

(51) Int. Cl.⁷ ................................................ F16D 3/68
(52) U.S. Cl. ........................................ 464/92; 403/223
(58) Field of Search ............................ 464/17, 51, 87, 464/88, 92, 93, 98, 147, 903; 403/179, 220, 223, 227, 228

(56) References Cited

U.S. PATENT DOCUMENTS

| 1,664,052 A | | 3/1928 | Ungar | |
|---|---|---|---|---|
| 2,860,496 A | * | 11/1958 | Guilbert | 464/92 |
| 2,996,900 A | * | 8/1961 | Fremier | 464/76 |
| 3,063,261 A | | 11/1962 | Sorenson | |
| 3,134,246 A | | 5/1964 | Mesh | |
| 3,410,112 A | * | 11/1968 | Gawreliuk | 464/73 |
| 3,910,068 A | | 10/1975 | O'Connor | |
| 4,385,893 A | * | 5/1983 | Kirschey | 464/17 |
| 2001/0053717 A1 | * | 12/2001 | Geislinger | 464/92 |

FOREIGN PATENT DOCUMENTS

| DE | 534 064 | 10/1931 |
|---|---|---|
| DE | A-34 34 722 | 4/1986 |
| DE | C-37 10 390 | 7/1996 |
| DE | 198 08 035 | 10/1998 |
| FR | 1 544 374 | 11/1967 |

* cited by examiner

Primary Examiner—Kenn Thompson
(74) Attorney, Agent, or Firm—Collard & Roe, P.C.

(57) ABSTRACT

The invention relates to an elastic shaft coupling, comprising at least one torsion element, with an elastomer body as transfer element, to which connecting flanges are fixed. According to the invention, the axial shortening of the elastomer body, in such an elastic shaft coupling, at high revolutions, can be reduced, without producing the resilience thereof, whereby the elastomer body is encompassed by a circumferential support ring, which is exclusively bonded to the elastomer body.

7 Claims, 3 Drawing Sheets

ELASTIC SHAFT COUPLING

CROSS REFERENCE TO RELATED APPLICATIONS

Application claim priority under 35 U.S.C. §119 of German Application No. 199 55 051.4, filed on Nov. 15, 1999. Application also claim priority under 35 U.S.C. §365 of PCT/EP00/11156, filed ON Nov. 10, 2000. The international application under PCT article 21 (2) was not published in English.

BACKGROUND OF THE INVENTION

The invention relates to an elastic shaft coupling comprising at least one torsion element that, as a transfer element, comprises an elastomer body, on which connection flanges are secured.

One problem afflicting shaft couplings of the type specified above known from the prior art is the fact that the elastomer body contracts axially especially at higher numbers of revolution. This has to be ascribed to the fact that the relatively soft elastomer attempts to yield outwards under the influence of the centrifugal forces, causing the connecting flanges to be pulled together. This effect is compounded even further under the torsional shearing stress occurring in the transmission of the torque. This effect is particularly pronounced if the elastomer body is made of a particularly soft material, or penetrated by cooling apertures. The axial movements of the connection flanges have to be compensated in the adjoining assemblies, which means that substantial expenditure is required.

It is known according to the prior art (e.g. from DE-C-37 10 390 and DE-A-4 34 722) to interrupt the elastomer body of an elastic shaft coupling in the center by providing it with ring-shaped disks, which are attached to the coupling by vulcanization and supported on the shaft on the inside. These ring disks and their support, however, mean that substantial additional expenditure is required, and that the resilience of the elastic shaft coupling is adversely affected.

It is already known from U.S. Pat. No. 3,910,068 to support the elastomer body of an elastic shaft coupling by means of a cylindrical tube against buckling directed outwards in the radial direction. The proposed design, however, has a number of drawbacks. The supporting cylindrical tube obstructs the torsional motion and, within the framework of shearing conditioned by torsion, leads to relative movements between the elastomer body and the rigid cylindrical tube that cause wear. Furthermore, the support by means of the cylindrical tube obstructs the dissipation of heat from the elastomer body and results in destruction of the elastomer body by heat when higher outputs need to be transmitted.

Therefore, the problem of the invention is to further develop the elastic shaft coupling of the type specified above to the extent that the axial shortening of the elastomer body is reduced while its resilience is impaired to the least possible extent.

SUMMARY OF THE INVENTION

For solving said problem, the invention proposes that the elastomer body is surrounded by a support ring that extends in the circumferential direction and is exclusively bonded to the elastomer body and is designed in the form of a metal profile comprising on its inner side protrusions projecting into the volume of the elastomer body.

The support ring as defined and proposed by the invention, like an externally applied bandage, holds the elastomer body together and supports the elastomeric components against the centrifugal force. The elastomeric compounds of the elastomer body will consequently yield outwards to a lesser extent, so that the axial shortening of the elastomer body is avoided to the greatest possible extent, or at least decisively reduced. Owing to the fact that the support ring is exclusively supported on the elastomer body, the support ring will hardly impair the resilience of the elastic shaft coupling.

The support ring is preferably mounted in the area located at half of the axial length of the elastomer body, i.e. where radial deformation in the outward direction has to be feared to occur most likely.

The support ring extending in the peripheral direction is usefully realized in the form of a metal profile that is provided on its inner side with protrusions projecting into the volume of the elastomer body. The protrusions cause the support ring to attach itself particularly intimately to the elastomer body and quasi becomes a component of the latter.

For the purpose of facilitating the assembly and dismantling of the elastic shaft coupling, the elastomer body, like the connection flanges, can be designed in the form of a rotational body divided in segments, whereby the support ring is segmented in the same way and the segments of the support ring are provided with connection means for connecting the segments of the support ring with each other. The connecting means assure that the segments of the support ring will form a closed ring that is exclusively supported on the elastomer body, in any after the coupling has been assembled.

The segments of the support ring usefully comprise fastening eyes projecting outwards. These fastening eyes are screwed together with connecting tabs extending in the circumferential direction of the elastomer body. Such a design of the connecting means permits particularly simple and quick mounting and removal of the elastomer body.

So as to avoid excessive heating of the elastomer body, it is provided with a multitude of cooling air channels. The inlet suction openings of the channels, which substantially extend in the axial direction, are arranged in the area of the connection flanges, and the outlet openings of these channels are substantially arranged in the radial direction along the periphery of the elastomer body. Such cooling air channels extending in the axial and radial directions work in a particularly effective way to the extent that the rotational motion of the elastomer body, in a manner that is similar to the operation of a radial compressor, produce a substantial pressure gradient between the suction inlet openings and the outlet openings. This pressure gradient provides for a particularly intensive stream of cooling air flowing through the elastomer body.

An optimal dissipation of the heat is obtained if provision is made for two groups of axially and radially extending cooling air channels that are provided in two axial planes arranged on both sides of the support ring. Owing to the great number of axially and radially extending cooling air channels located on both sides of the axial center plane, an intensive and uniformly distributed dissipation of the heat is achieved, so that no clusters of heat can develop in the elastomer body.

The two groups of axially and radially extending cooling air channels are usefully arranged in a symmetrical manner in relation to the axial center plane. This creates the same elasticity and heating conditions on both sides of the support ring on the driving and output sides. Furthermore, the elastomer bodies so designed can be installed during the assembly both on the right and left sides.

BRIEF DESCRIPTION OF THE DRAWINGS

An exemplified embodiment of the invention is explained in greater detail in the following with the help of the drawing, in which.

DETAILED DESCRIPTION OF THE INVENTION

Figure 1:
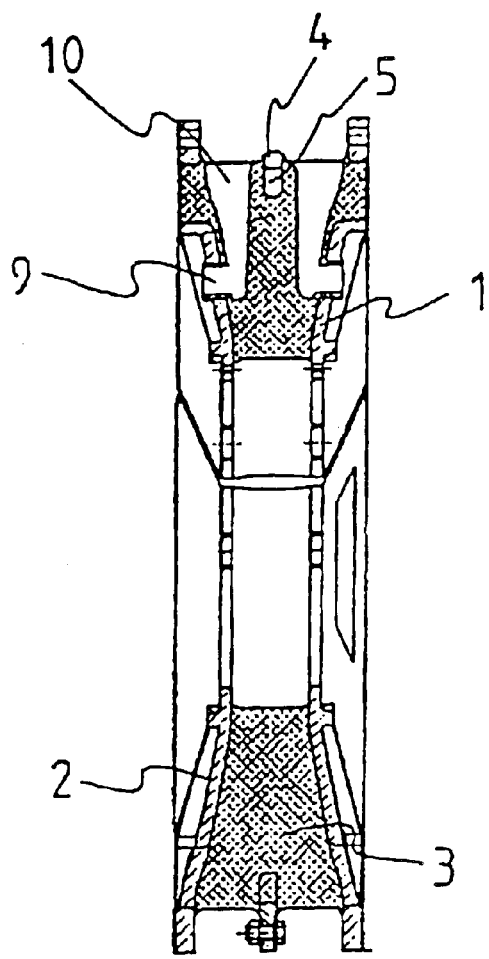
FIG. 1 shows a section extending in the axial direction through a shaft coupling as defined by the invention.
Figure 2:
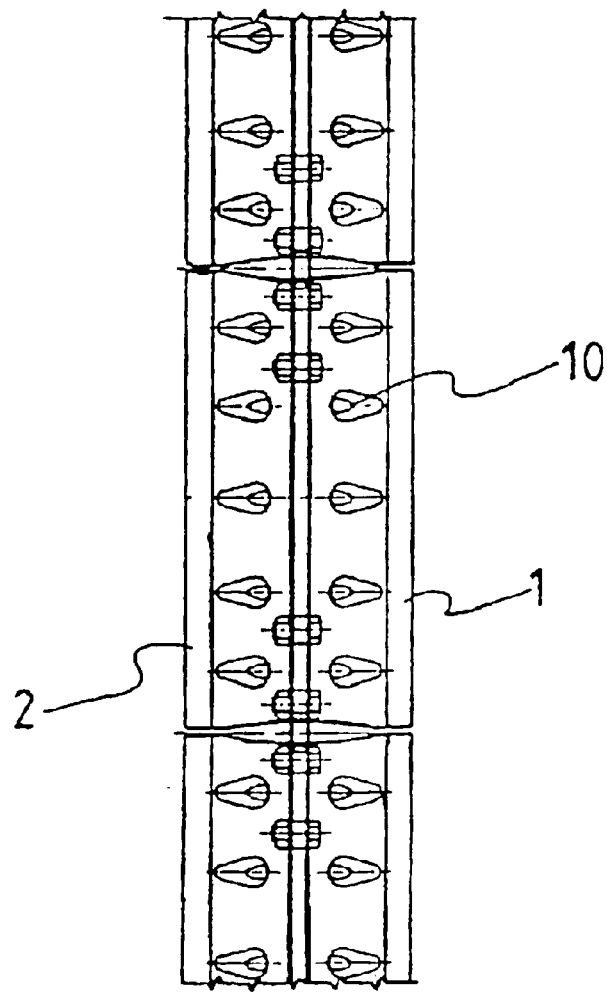
FIG. 2 is a top view A of FIG. 1 developed in the plane of the drawing.
Figure 3:
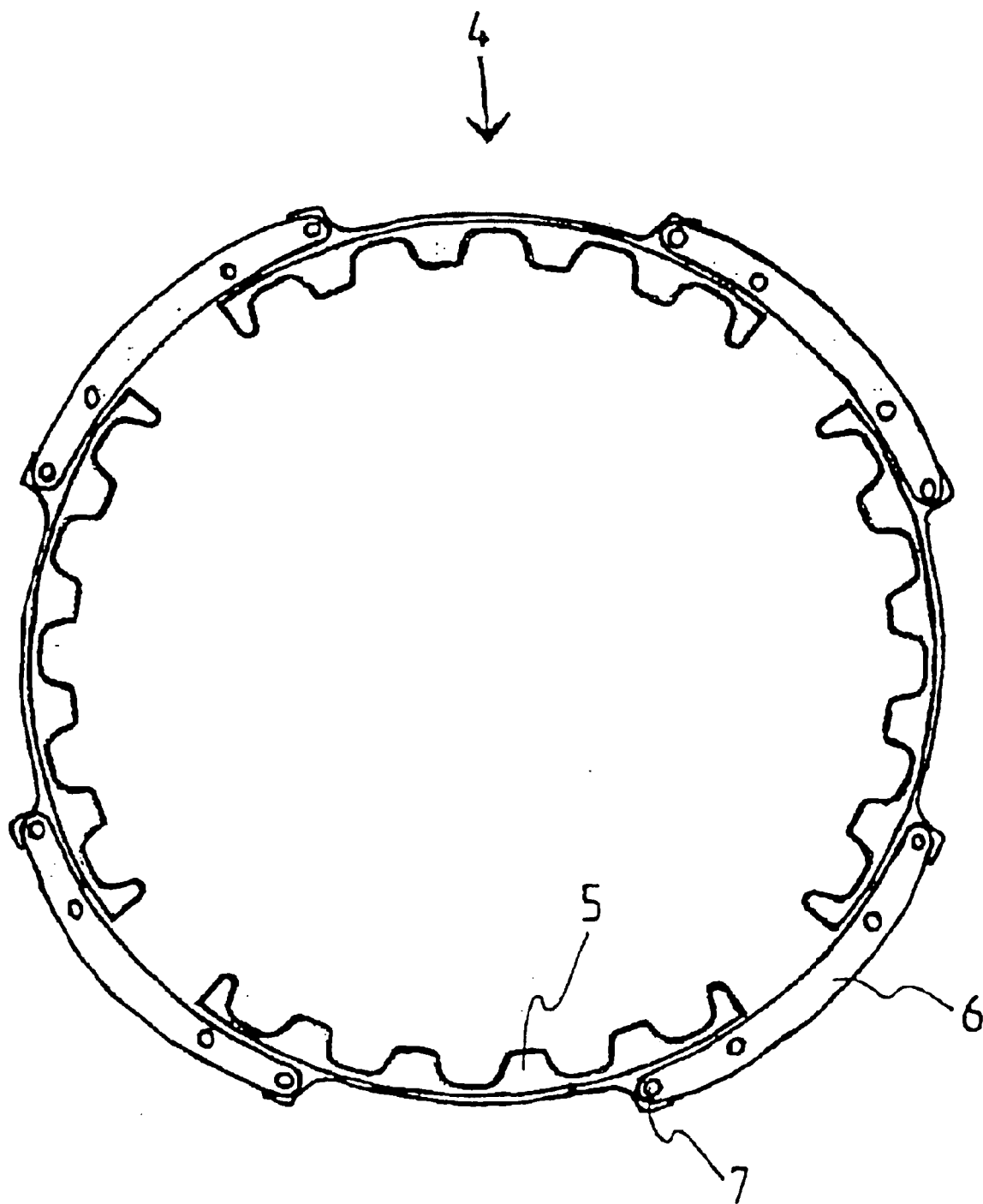
FIG. 3 is an isolated side view of the support ring.
Figure 4:
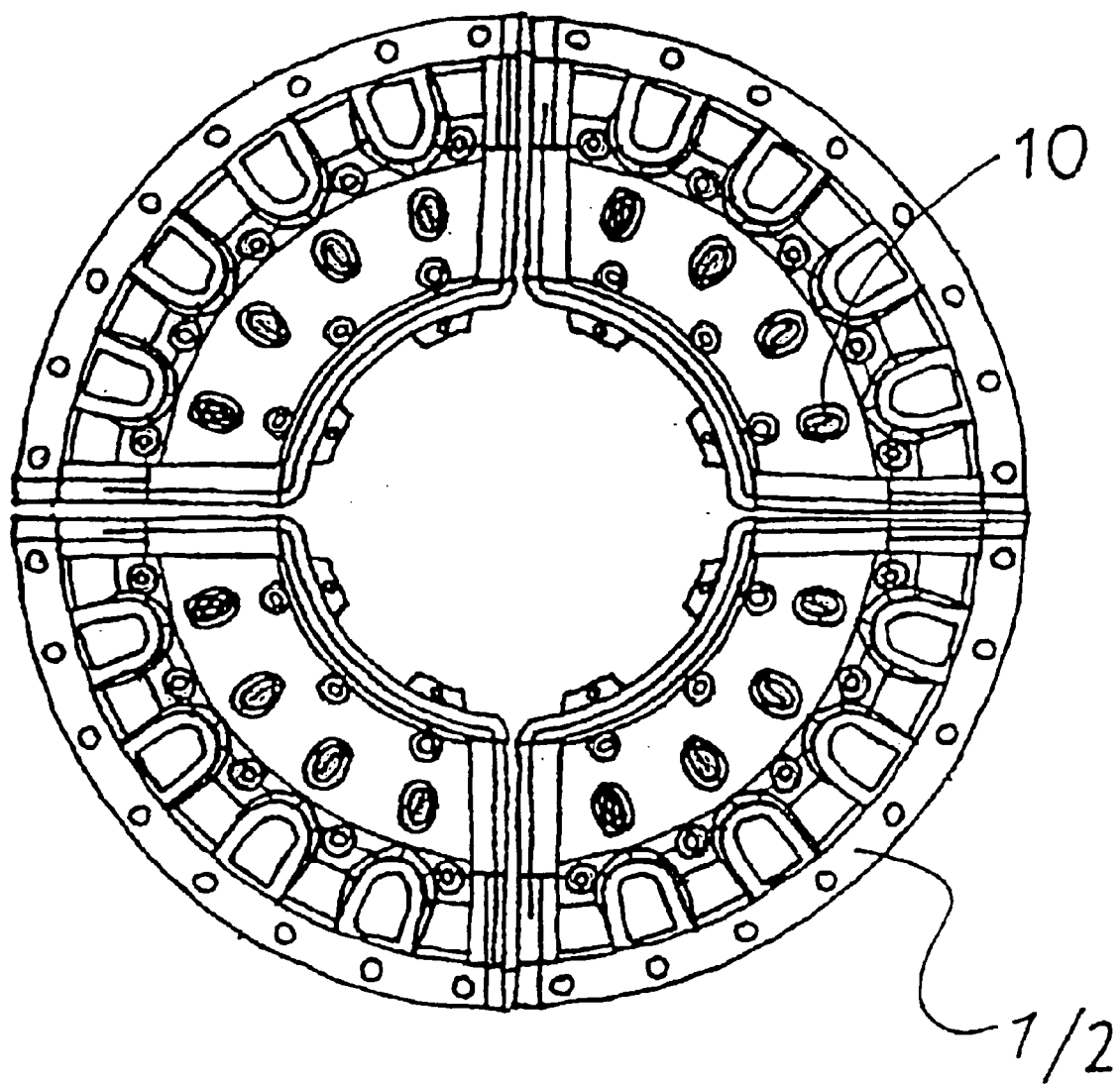
FIG. 4 is an axial view of the shaft coupling shown in FIG. 1.

The shaft coupling shown in the drawing comprises the two connection flanges 1 and 2. An elastomer body 3 is arranged between said flanges. The connection flanges 1 and 2 and the elastomer body 3 are bonded to each other by vulcanization.

In the exemplified embodiment shown, both the connection flanges 1 and 2 and the elastomer body 3 are divided in four segments, whereby each segment extends over an arc of about 90°.

According to the invention, the elastomer body 3 is surrounded in the area of half of its axial length by a support ring 4 extending in the circumferential direction. Said support ring is exclusively supported on the elastomer body 3. The support ring 4 extending in the circumferential direction is designed in the form of a metal profile that is provided in its inner side with the protrusions 5 projecting inwards into the volume of the elastomer body 4. The support ring 4 is segmented in this connection in the same way as the elastomer body 3. The individual segments of the support ring 4 are connected among themselves by the connection tabs 6 extending between the individual support ring segments in the circumferential direction. The connection tabs 6 are screwed together with the fastening eyes 7, which are located on the outside of the support ring segments and project radially beyond the outer circumference of the support ring 4. Furthermore, provision is made in the elastomer body 3 for the cooling air channels 8. Said cooling air channels 8 have the suction inlet openings 9, which substantially extend axially through the connection flanges 1 and 2, and the outlet openings 10, which exit substantially radically from the elastomer body 3 on both sides of the support ring 4.

The axially and radially extending cooling air channels 8 are symmetrically arranged in two axial planes located on both sides of the support ring 4 in relation to the axial center plane of the shaft coupling.

What is claimed is:

1. An elastic shaft coupling comprising:

at least one torsion element having as a transmission element an elastomer body;

connection flanges secured on said elastomer body;

a support ring (4) extending in a circumferential direction of said elastomer body and surrounding the elastomer body, wherein said support ring is not in contact with the connection flanges and wherein said support ring is exclusively bonded to the elastomer body (3), and is formed as metal profile having on its inner side protrusions (5) projecting into the volume of the elastomer body (3).

2. The elastic shaft coupling according to claim 1, characterized in that the support ring (4) is arranged in the area of half of the axial length of the elastomer body (3).

3. The elastic shaft coupling according to claim 1, characterized in that the elastomer body (3) is designed in the form of a rotational body divided in segments, whereby the support ring (4) is segmented in the same way and the support ring segments are provided with connecting means for interconnecting said segments.

4. The elastic shaft coupling according to claim 3, characterized in that the support ring segments comprise outwardly projecting fastening eyes (7), the latter being screwed together with connection tabs (6) extending in the circumferential direction of the elastomer body (3).

5. The elastic shaft coupling according to claim 1, characterized in that the elastomer body (3) is provided with a multitude of cooling air channels (8), the axially extending suction inlet openings (9) of which are arranged in the area of the connection flanges (1, 2), and substantially radially extending outflow openings (10) of which are arranged on the periphery of the elastomer body (3).

6. The elastic shaft coupling according to claim 5, characterized in that provision is made for two groups of axially and radially extending cooling air channels (8), said channels being arranged in axial planes arranged on both sides of the support ring (4).

7. The elastic shaft coupling according to claim 6, characterized in that the two groups of axially and radially extending cooling air channels (8) are symmetrically arranged with respect to the axial center plane of the shaft coupling.

* * * * *